United States Patent
Garg et al.

(10) Patent No.: US 12,001,415 B2
(45) Date of Patent: Jun. 4, 2024

(54) HIERARCHAL DATA STRUCTURE MODIFICATION

(71) Applicant: Oracle International Corporation, Redwood Shores, CA (US)

(72) Inventors: Anurag Garg, Cupertino, CA (US); Douglas Ray Cosby, Austin, TX (US); James Charles McCausland, Frisco, TX (US)

(73) Assignee: Oracle International Corporation, Redwood Shores, CA (US)

( * ) Notice: Subject to any disclaimer, the term of this patent is extended or adjusted under 35 U.S.C. 154(b) by 6 days.

(21) Appl. No.: 17/860,811

(22) Filed: Jul. 8, 2022

(65) Prior Publication Data

US 2023/0237034 A1    Jul. 27, 2023

Related U.S. Application Data

(60) Provisional application No. 63/303,163, filed on Jan. 26, 2022.

(51) Int. Cl.
*G06F 16/22*    (2019.01)
(52) U.S. Cl.
CPC .............................. *G06F 16/2246* (2019.01)
(58) Field of Classification Search
CPC ............. G06F 16/2246; G06F 16/2365; G06F 16/288; G06F 16/282
USPC ........ 707/610, 611, 612, 614, 620, 655, 797
See application file for complete search history.

(56) References Cited

U.S. PATENT DOCUMENTS

| | | | |
|---|---|---|---|
| 6,948,171 B2 | 9/2005 | Dan et al. | |
| 7,461,008 B2 | 12/2008 | Garrow et al. | |
| 7,640,229 B1 * | 12/2009 | Kaufmann | G06F 16/24565 707/999.001 |
| 8,065,277 B1 * | 11/2011 | Gardner | G06F 16/907 707/673 |
| 9,208,167 B1 | 12/2015 | Henderson | |
| 10,275,281 B2 | 4/2019 | Pradeep et al. | |
| 10,296,629 B2 * | 5/2019 | Chidambaran | G06F 16/252 |

(Continued)

OTHER PUBLICATIONS

"Conflict Analysis and Collision Detection", Retrieved from https://techdocs.broadcom.com/us/en/ca-enterprise-software/business-management/ca-service-management/17-1/using/change-management/conflict-analysis-and-collision-detection.html#concept.dita_ed6863c6550d6e8342931db43bbc378a8640ab76_DetectandInvestigateConflicts, Sep. 22, 2020, 3 Pages.

(Continued)

*Primary Examiner* — Phong H Nguyen
(74) *Attorney, Agent, or Firm* — Invoke

(57) ABSTRACT

Techniques for modifying hierarchal-structured data of one hierarchal data structure based on a modification to another hierarchal data structure are disclosed. A system determines that a modification has been made, or is requested to be made, to a particular hierarchal data structure. The system analyzes a set of rules to determine whether the modification of the hierarchal data structure triggers another modification to an additional hierarchal data structure. The additional hierarchal data structure includes different nodes, or nodes arranged in a different hierarchal structure, than the particular hierarchal data structure. The system modifies the additional hierarchal data structure based on the rule. The modification of the additional hierarchal data structure is different than the modification to the particular hierarchal data structure.

20 Claims, 9 Drawing Sheets

(56) References Cited

U.S. PATENT DOCUMENTS

| | | |
|---|---|---|
| 11,106,658 B2 | 8/2021 | Cseri et al. |
| 2005/0044108 A1 | 2/2005 | Shah et al. |
| 2005/0044187 A1 | 2/2005 | Jhaveri et al. |
| 2005/0044530 A1 | 2/2005 | Novik |
| 2007/0214159 A1* | 9/2007 | Lawson ............... G06F 16/2379 707/999.101 |
| 2008/0077612 A1 | 3/2008 | Zobin et al. |
| 2009/0024999 A1 | 1/2009 | Ingman et al. |
| 2010/0185595 A1 | 7/2010 | Gopalakrishnan et al. |
| 2013/0006920 A1 | 1/2013 | Kreindler |
| 2014/0006768 A1 | 1/2014 | Carter et al. |
| 2014/0282586 A1 | 9/2014 | Shear et al. |
| 2015/0012489 A1 | 1/2015 | Ceribelli et al. |
| 2018/0018361 A1* | 1/2018 | Liang ....................... G06F 16/00 |
| 2018/0349408 A1* | 12/2018 | Jewell .................... G06F 16/185 |
| 2019/0340166 A1 | 11/2019 | Raman et al. |
| 2021/0064602 A1 | 3/2021 | Mietke |
| 2021/0117410 A1 | 4/2021 | Sekniqi et al. |
| 2023/0106118 A1 | 4/2023 | Feng et al. |

OTHER PUBLICATIONS

"Conflict calendar", Retrieved from https://docs.servicenow.com/bundle/sandiego-it-service-management/page/product/change-management/concept/change-conflict-calendar.html#view-change-conflict-calendar, Retrieved on Jul. 2022, 2 Pages.

"Data Factory scheduling and execution", Retrieved from https://docs.microsoft.com/en-us/azure/data-factory/v1/data-factory-scheduling-and-execution, Oct. 22, 2021, 29 Pages.

"Manage your change schedules and resolve conflicts", Retrieved from https://docs.servicenow.com/bundle/sandiego-it-service-management/page/product/change-management/task/use-conflict-calendar.html, Retrieved on Jul. 2022, 2 Pages.

"ServiceNow—Conflict detection", Retrieved from https://docs.servicenow.com/bundle/sandiego-it-service-management/page/product/change-management/concept/c_ConflictDetection.html, Retrieved on Jul. 2022, 2 Pages.

Sheng et al., "Scheduling OLTP Transactions via Machine Learning", Retrieved from https://arxiv.org/pdf/1903.02990.pdf, May 29, 2019, 28 Pages.

* cited by examiner

HIERARCHAL DATA STRUCTURE MODIFICATION

BENEFIT CLAIMS; RELATED APPLICATIONS; INCORPORATION BY REFERENCE

This application claims the benefit of U.S. Provisional Patent Application 63/303,163, filed Jan. 26, 2022, which is hereby incorporated by reference. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to rule-based modification of hierarchal data structures. In particular, the present disclosure relates to applying a set of rules to modify properties of a hierarchal data structure based on modifications to another hierarchal data structure.

BACKGROUND

Organizations and enterprises generate large quantities of data that must be searchable to be useful to the organization. For example, a change in organization structure may result in varying zones of responsibility for employees that must be tracked for the organization to operate efficiently. A merger of two organizations may result in employee positions and entire cost centers being added, removed, or combined. A simple purchase transaction may include a receipt containing details about the products or services purchased, the store location, the buyer, payment terms, the transaction date, and so on. Sales transactions are booked in an organization's general ledger and posted to revenue accounts. Costs associated with creating and fulfilling purchases are recorded in expense accounts. Cost centers record expenses of companies and organizations within the company that support sales transactions. Every aspect of an organization or enterprise that describes and supports the functions of the enterprise generates data. Searching and analyzing the data—which is often in the terabytes—is vital to improve functioning of an enterprise.

Enterprise data management systems allow different entities in an enterprise to access the enterprise data using different applications. For example, an accounting department runs an application that accesses one portion of the enterprise data. A sales department runs an application that accesses another portion of the enterprise data. The data accessed by the different entities may be entirely different or it may overlap. When one entity changes enterprise data, the enterprise data management system synchronizes the changes across any applications running in the enterprise to maintain consistency in the enterprise data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
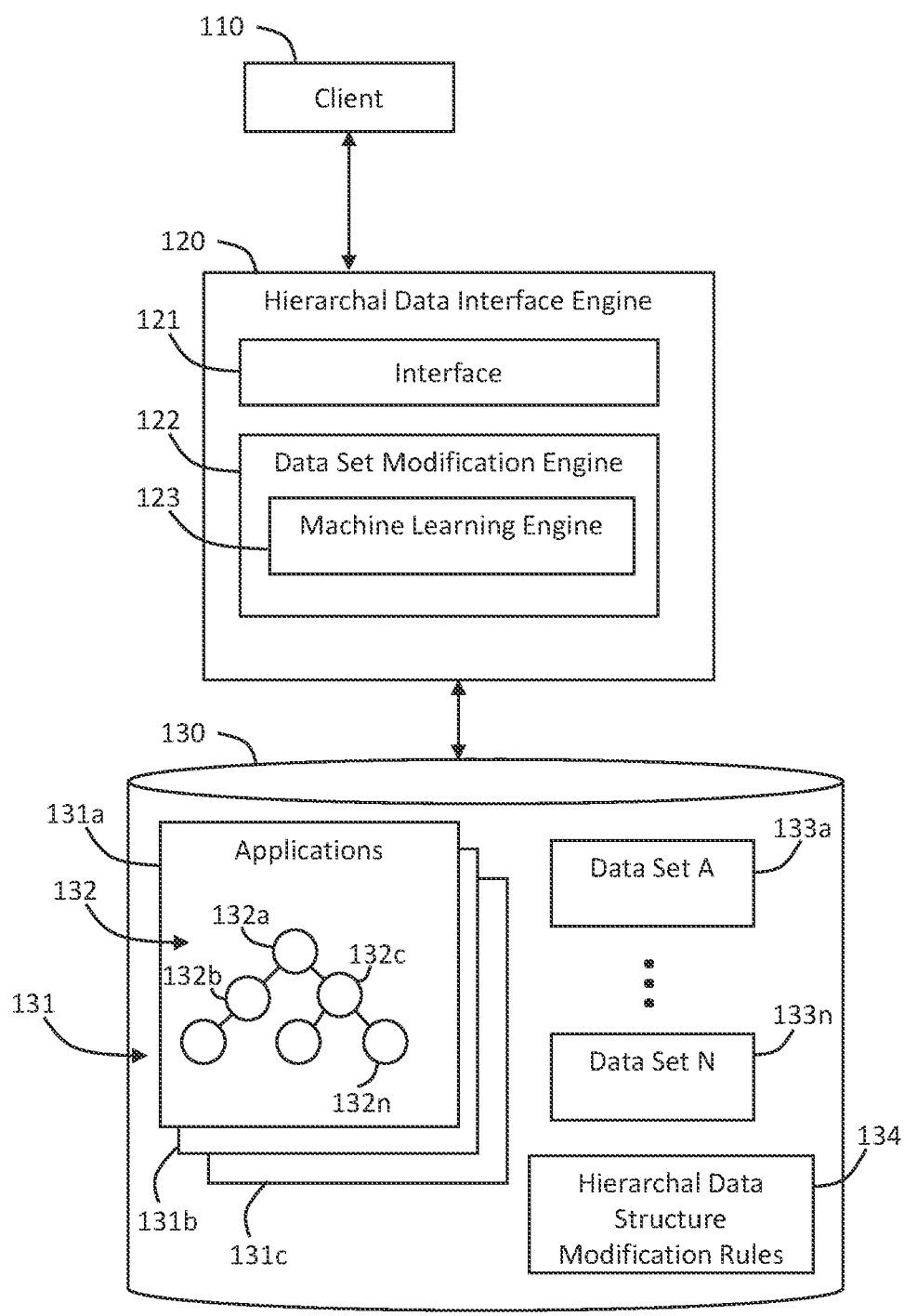
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. RULE-BASED MODIFICATION OF HIERARCHAL DATA STRUCTURES
4. MACHINE LEARNING MODEL TRAINING
5. FEEDBACK-BASED MODIFICATION OF MACHINE LEARNING MODEL FOR GENERATING RULES FOR MODIFYING HIERARCHAL DATA STRUCTURES
6. EXAMPLE EMBODIMENT
7. COMPUTER NETWORKS AND CLOUD NETWORKS
8. MISCELLANEOUS; EXTENSIONS
9. HARDWARE OVERVIEW

1. General Overview

A system maintains multiple hierarchal data structures. Each hierarchal data structure includes nodes that represent entities. Relationships between the entities may be represented by links between the nodes in the hierarchal data structure. Furthermore, a node may be associated with properties that represent the properties of the corresponding entity. While the hierarchical data structures differ, a portion of the information represented by each of the hierarchical data structures may overlap. For example, a first hierarchal data structure may include a node representing a manager at a company and child nodes for each of the direct reports of that manager. A second concurrently implemented hierarchal data structure may include a node, for the same manager, with child nodes representing functional teams of direct reports of that same manager. Since multiple direct reports, that are part of the same functional team, would be represented by a single node in the second hierarchal data structure, there may be fewer child nodes for the manager node in the second hierarchal data structure.

One or more embodiments maintain consistency between different hierarchal data structures such that the entity relationships and entity properties represented by one hierarchal data structure do not conflict with the entity relationships and entity properties represented by another hierarchal data structure. The system applies a set of rules to a modification of hierarchal data structure to determine modifications of one or more other hierarchal data structures. The system-determined modifications of hierarchal data structures maintain consistency by avoiding conflicts between the entity relationships and entity properties represented by different hierarchal data structures.

Continuing the above example, the system may receive an instruction to delete a child node corresponding to a direct report of the manager in the first hierarchal data structure. The system applies a set of rules based on the delete operation to determine whether any additional direct reports of the manager are in a same functional team as the direct report that was removed. If no additional direct reports of the manager are in the same functional team, the child node in the second hierarchal data structure that represents the functional team is deleted. If additional director reports of the manager are in the same functional team, the child node in the second hierarchal data structure that represents the functional team is retained.

One or more embodiments apply a machine learning model to a modification of a hierarchal data structure to determine a modification(s) for a different hierarchal data structure(s). The system obtains historical data identifying modifications to hierarchal data structures. The machine learning model is trained, using the historical data, to learn the types of modifications that are executed at approximately the same time across different hierarchal data structures. Based on the training, the machine learning model learns of an association between the types of modifications across the different hierarchal data structures. Thereafter, when the machine learning model is applied to a particular modification of a hierarchal data structure, the machine learn model outputs an associated modification to be executed on another hierarchal data structure. The associated modification, as determined by the machine learning model, may be executed without further user input, or presented to a user as a recommendation.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes a hierarchal data interface engine 120. A client 110 interacts with the hierarchal data interface engine 120 to access data in the data repository 130. The data includes hierarchal data structures 131, or applications, associated with one or more data sets (data set A-data set N) 133a-133n. The data sets 133a-133n may include overlapping data among two or more data sets. A data set 133a may include first data that is included another data set 133n. The data set 133a may include second data that is excluded from the other data set 133n. The data sets 133a-133n may be subsets of a single data set. For example, all enterprise data may comprise a single data set. The subsets of enterprise data accessed by different applications 131 associated with different individuals in the enterprise may comprise subsets of the single data set. According to one example, an application 131a associated with a first department in an enterprise defines a first hierarchal data structure 132 comprising a set of nodes 132a-132n. The first hierarchal data structure 132 is associated with a first data set 133a among the data sets 133a-133n. For example, the first department may be "human resources," and the set of nodes in the hierarchal data structure 132 may correspond to sets of data accessed by the application 131a to populate a graphical user interface (GUI) used by employees of the department "human resources." A second application 131b associated with another department ("sales") includes a different hierarchal data structure made up of different nodes than those represented in the first application 131a. The second application 131b is associated with another data set 133b different from the data set 133a. Although the second application 131b is associated with another data set 133b different from the data set 133a, one or more nodes may be the same in the hierarchal data structures of the applications 131a and 131b. A third application 131c associated with another department ("Manufacturing") includes a different hierarchal data structure made up of different nodes than those represented in the first application 131a and the second application 131b.

Each node 132a-132n in the hierarchal data structure 132 is a data structure of a particular type representing a particular entity. Examples of entities include "employee," "customer," "account," "cost center," and "city." An example of a hierarchy includes a "product line" type parent node, two "product"-type child nodes, a separate "product development team" and "sales team"-type child node for each "product"-type node, and "employee"-type nodes for each "product development team" and "sales team"-type node. Each node is defined by a set of node properties. For example, an "employee" type node may include node properties: "employee name," "employee class," "employee title," "salary," "residence," "contact information," "supervisor," and "department." As another example, a node-type "product" may include node properties: "product name," "product type," "manufacturing group," "marketing group," and "development group."

The different hierarchal data structures 132 of the different applications 131a-131c may include: one hierarchal data structure having a node that another hierarchal data structure does not; different hierarchal data structures having the same nodes in different positions within the hierarchal data structures (such as depending from different parent nodes, or being a parent to different children nodes); and one hierarchal data structure having multiple instances of a node while another hierarchal data structure has only one instance of the node (or fewer instances of the node).

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the hierarchal data interface engine 120. Alternatively, or additionally, a data repository 130 may be implemented or executed on a computing system separate from the hierarchal data interface engine 120. A data repository 130 may be communicatively coupled to the hierarchal data interface engine 120 via a direct connection or via a network.

Information describing applications 131, hierarchal data structures 132, and data sets 133 may be implemented across any of components within the system 100. However, this information is illustrated within the data repository 104 for purposes of clarity and explanation.

The hierarchal data interface engine 120 includes an interface 121. The interface 121 provides functionality for the client 110 to access the data in the data repository 130.

In one or more embodiments, interface 121 refers to hardware and/or software configured to facilitate communications between a user or the client 110 and the hierarchal data interface engine 120. Interface 121 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 121 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 121 is specified in one or more other languages, such as Java, C, or C++.

For example, the interface 121 may provide data to the client 110 to render graphics, such as application pages and web pages associated with an application 131 on the client 110. Data fields and other elements of the rendered graphics may be populated based on nodes and node properties of the hierarchal data structures 132. For example, the interface 121 may generate GUI content to display node properties comprising employee data associated with a node of a type "employee."

The data set modification engine 122 provides functionality to allow users and clients 110 to modify data in the data sets 133a-133n. The data set modification engine 112 applies rules 134 to determine whether, and how, to modify additional hierarchal data structures based on receiving instructions to modify a particular hierarchal data structure. The data set modification engine 122 may obtain the rules 134 via user input and by generating rules based on learning patterns for modifying different hierarchal data structures. For example, the data set modification engine 122 may analyze a set of historical instructions to modify the hierarchal data structures to determine that a particular modification to one node property of one hierarchal data structure corresponds to a modification of a different node property in another hierarchal data structure. In addition, or in the alternative, the data set modification engine 122 may determine that the positioning of a particular node at a particular location in one hierarchal data structure corresponds to the positioning of another instance of the same node at a different location (such as being associated with a different parent node) in a different hierarchal data structure.

For example, a user interacting with the interface 121 may access a GUI provided by the data set modification engine 122 to view and/or modify the application 131a. Upon selection of a user interface element in the GUI, a display element of the interface 121 may display the hierarchal data structure 132 associated with the application 131a. A user may select an individual node 132a-132n in the hierarchal data structure 132 to obtain additional information about an entity represented by the node. The data set modification engine 122 may provide functionality to allow a user to interact with the GUI to add nodes to the hierarchal data structure 132, remove nodes from the hierarchal data structure 132, modify node attributes of existing nodes 132a-132n in the hierarchal data structure, or move the position of nodes in the hierarchal data structure 132, such as changing parent/child relationships among nodes. Based on detecting a modification to a hierarchal data structure 132 in the application 131a, the data set modification engine 122 applies a set of rules 134 to identify additional modifications in other hierarchal data structures of other applications 131b and 131c. The additional modifications in the other hierarchal data structures may include, for example, making a same change to a same node in another hierarchal data structure, making a different change to the same node in another hierarchal data structure, or making a change to a different node in another hierarchal data structure.

For example, upon detecting deletion of a node 132n, representing a location "Austin office" in the hierarchal data structure 132, the data set modification engine 122 applies a set of rules 134 to (a) delete a node representing the location "Austin office" from a hierarchal data structure of the application 131b, and (c) leave in place a node representing the location "Austin office" in a hierarchal data structure of the application 131c. As another example, the data set modification engine 122 may detect a user selection to move node 132c from being a child of node 132a to being a child of node 132b. The data set modification engine 122 applies the set of rules 134 to (a) leave the parent/child relationships of the corresponding nodes unchanged in a hierarchal data structure of the application 131b, and (b) change the parent/child relationships of the corresponding nodes in a hierarchal data structure of the application 131c.

In one or more embodiments, the data set modification engine 122 includes a machine learning engine to learn correlations among nodes and node properties and to recommend rules for modifying one hierarchal data structure based on modifications to another hierarchal data structure. In addition, or in the alternative, the data set modification engine 122 may include a machine learning engine to learn correlations among nodes, node properties, and historical patterns of modifications to hierarchal data structures, and to recommend modifications one hierarchal data structure based on modifications to another hierarchal data structure.

Examples of applying rules to modify one hierarchal data structure differently from another hierarchal data structure include: modifying a node property of a node in one hierarchal data structure, and modifying a different node property of another node in another hierarchal data structure; modifying a node property value of a node in one hierarchal data structure, and modifying the same node property of another node in another hierarchal data structure to have a different node property value; modifying a node in one hierarchal data structure, and modifying multiple nodes in another hierarchal data structure; adding a node to a location in one hierarchal data structure, and adding the node to a different location in another hierarchal data structure; adding a node to a location in one hierarchal data structure, and refraining from adding the node to the same location in another hierarchal data structure (such as between two nodes that are common to both hierarchal data structures); adding one node to one location in one hierarchal data structure, and adding the node to multiple locations in another hierarchal data structure; adding a node as a child node of a particular parent node in one hierarchal data structure, and, based on determining that the parent node does not exist in another hierarchal data structure, adding the node as a child node of a different parent node in the latter hierarchal data structure.

In one or more embodiments, applying the rules to modify hierarchal data structures includes applying a mathematical or logical formula to a node property value modified in one hierarchal data structure to obtain a node property value for the same, or another, node property of a node in another hierarchal data structure.

In one or more embodiments, the rules specify which modifications to hierarchal data structures result in modifications to other hierarchal data structures. For example, a first hierarchal data structure may be considered a primary hierarchal data structure. Changes made to the primary hierarchal data structure may result in modifications to one or more secondary hierarchal data structures. The rules may specify that changes to the secondary hierarchal data structures do not result in changes to the primary hierarchal data structure. However, changes to the secondary hierarchal data structures may result in modifications to other secondary hierarchal data structures and any tertiary hierarchal data structures. Similarly, the rules may specify that changes to tertiary hierarchal data structures do not result in changes to secondary hierarchal data structures or the primary hierarchal data structure. However, the changes to the tertiary hierarchal data structures may result in changes to other tertiary hierarchal data structures.

In one or more embodiments, the rules specify particular types of changes that result in modification of additional hierarchal data structures. For example, the rules may specify that modifying node properties of nodes in a particular hierarchal data structure results in modifications of node properties in another hierarchal data structure. However, the rules may specify that modifying the positions of nodes within the particular hierarchal data structure (such as adding, removing, or changing a parent or child node for a particular node) does not result in modifying another hierarchal data structure.

In one embodiment, different nodes or different hierarchal data structures require different permissions to perform modifications. For example, one hierarchal data structure may be considered a "general ledger" for an enterprise, comprising a master set of nodes and node properties based on a superset of enterprise data. Each department within the enterprise may maintain a separate hierarchal data structure for an application particular to the department. The hierarchal data structures maintained by the departments may include subsets of nodes from the general ledger. The departments may have modification permissions for only the nodes associated with their particular hierarchal data structures. The departments may not have modification permissions for other nodes in the general ledger. Alternatively, the modification permissions may be based on a number of different departments that may access the node and node properties or an identify of a user attempting to modify node properties.

In one or more embodiments, the hierarchal data interface engine 122 applies the rules to ensure nodes of different hierarchies are non-conflicting with each other. For example, modifying a particular node property of a node representing a particular employee that is located in two hierarchal data structures results in the modification of the node property in both hierarchal data structures. However, if one node associated with the particular employee is a customized node, or contains one or more node properties that vary from a node associated with the particular employee in another hierarchal data structure, then modifying the node property in one hierarchal data structure may result in a different modification in the other hierarchal data structure. As an example, a node type "product" in one hierarchal data structure may have a node property "class." A node type "product" in another hierarchal data structure may have different node properties. The latter may not have a node property "class," but may have a node property "color." A rule may specify that each class is associated with a particular color, such that if a "class" value is modified from "A" to "B" in one hierarchal data structure, the "color" value is modified from "blue" to "red" in the other hierarchal data structure. Although node types may include different node properties in different hierarchal data structures, the rules ensure the different hierarchal data structures are non-conflicting.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

In one or more embodiments, the hierarchal data interface engine 120 refers to hardware and/or software configured to perform operations described herein for modifying nodes in hierarchal data structures. Examples of operations for modifying nodes in hierarchal data structures are described below with reference to FIG. 2.

In an embodiment, the hierarchal data interface engine 120 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, the client 110 may represent a tenant, and the system may include multiple separate tenants. A tenant is a corporation, organization, enterprise, or other entity that accesses a shared computing resource, such as the hierarchal data interface engine 120 and data sets 133a-133n. In an embodiment, tenants are independent from each other. A business or operation of one tenant is separate from the business or operations of another tenant.

3. Rule-Based Modification of Hierarchal Data Structures

Figure 2:
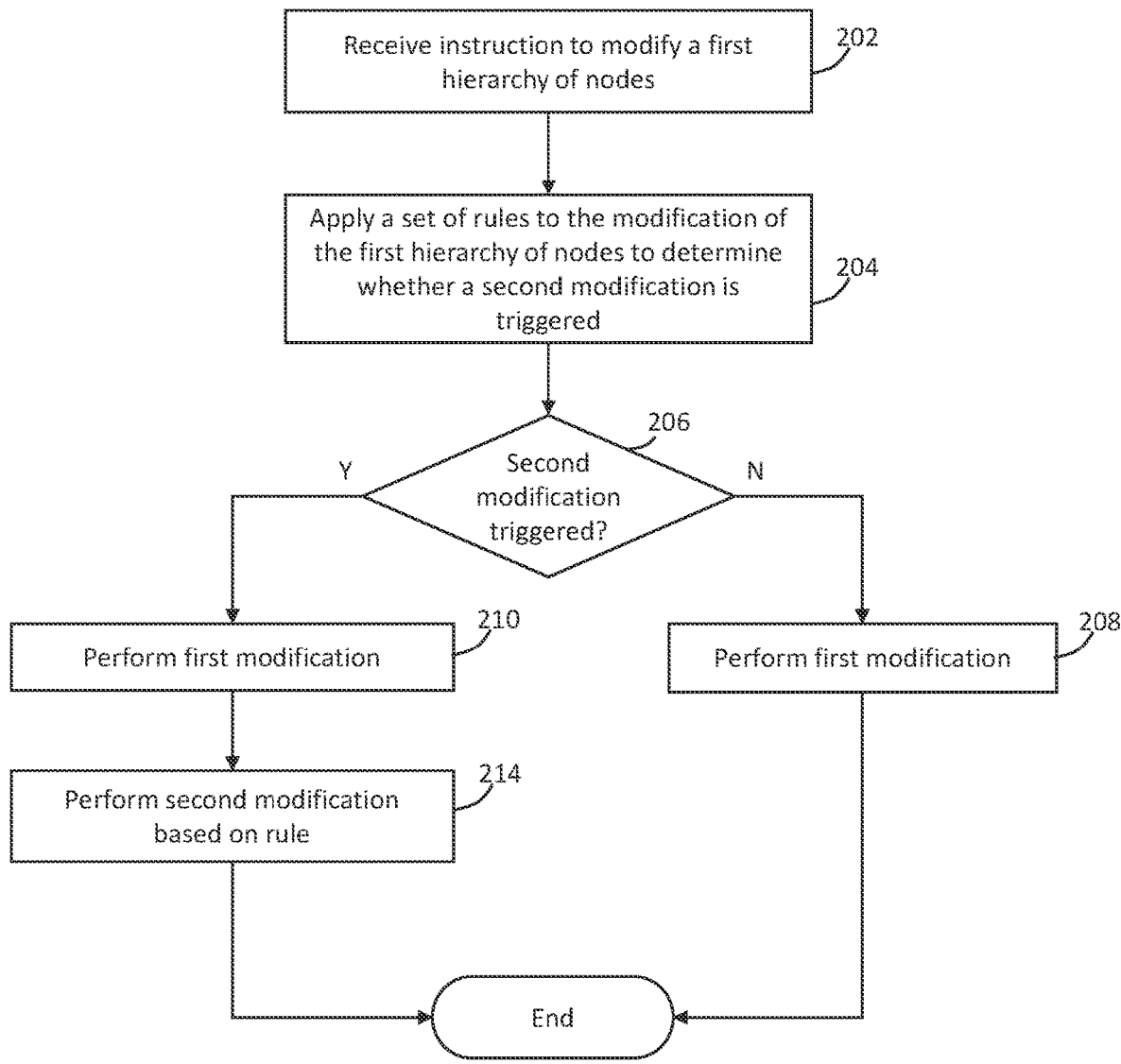
FIG. 2 illustrates an example set of operations for rule-based modifications to hierarchal data structures in accordance with one or more embodiments.

FIG. 2 illustrates an example set of operations for modifying different hierarchal data structures based on a modification to one hierarchal data structure in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system receives an instruction to modify a first hierarchy of nodes (Operation 202). The first hierarchy of nodes is a hierarchal data structure in which the nodes represent entities and include node properties. The modification may include modifying node properties, adding or removing nodes, or moving nodes from one position in the hierarchy to another position in the hierarchy (i.e., changing one or both of a parent node or child node).

In one or more embodiments, hierarchal data structures are mapped to one or more datasets. The one or more datasets include tables and data objects storing properties, property values, arrays, and sets of records. For example, one data object type may be "Offices." Data objects of the data object type may include a set of names of locations where an organization has offices. One object may have an object name "Main Office." Another object may have an object name "Singapore Office." The objects may have properties, such as "City," "Manager," "Products," and "Department." An operations executive may access a user interface to generate a view of a hierarchal data structure that includes nodes associated with offices. One node may be the "Main Office." Another node may be the "Singapore office." Each of the office-type nodes in the view of the hierarchal data structure may include two child nodes: "City" and "Products." Each "Products" node may include one or more child nodes specifying particular products associated with a particular office. A human resources executive may access the user interface to generate a view of another hierarchal data structure that includes nodes associated with offices. The nodes may include the "Main Office" node and the "Singapore Office" node. However, the hierarchal data structure view accessed by the human resources executive may differ from that of the operations executive. The child nodes of the office-type nodes viewed by the human resources executive may include a "manager" type node. Child nodes of the manager-type node may include nodes for employees managed by the manager. Although the hierarchal data structures viewed by the two executives may have one or more nodes in common and may be obtained from the same data set, the hierarchal data structures may differ in the nodes included in the hierarchal data structures and the parent/child relationships represented in the hierarchal data structures.

The system applies a set of rules to the modification of the first hierarchy of nodes (Operation 204) to determine whether the modification of the first hierarchy of nodes triggers a second modification to a second hierarchy of nodes (Operation 206). The system may generate the set of rules using a machine learning model that analyzes modifications to nodes over time and recognizes correlations among modifications to the first hierarchy of nodes and modifications to the second hierarchy of nodes. The system may also create or build the set of rules based on user input. For example, a user may specify that a particular modification to a particular node in one hierarchy of nodes triggers additional modifications to additional nodes in other hierarchies of nodes. An example rule may include, when a same node is present in multiple node hierarchies, modifying the same node in the same way across the multiple node hierarchies. Another example rule may include, when parent/child relationship of a node relative to another node is modified in one node hierarchy: (a) modifying a parent/child relationship of the same node in another node hierarchy in the same way, and (b) leaving unmodified a parent/child relationship of the same node in yet another hierarchy. Additional rules include modifying different nodes across different node hierarchies based on a modification of a particular node in a particular node hierarchy. Additional rules include refraining from adding a particular node to a second hierarchy of nodes when the particular node is added to a first hierarchy of nodes.

Based on determining that the modification to the first hierarchy of nodes does not trigger a modification to another hierarchy of nodes, the system performs the modification to the first hierarchy of nodes (Operation 208). For example, the system may add a node, delete a node, or modify a node in the first hierarchy of nodes without triggering the addition, deletion, or modification of any node in the second hierarchy of nodes. According to one example embodiment, the second hierarchy of nodes may include a same node as the modified node.

For example, in one embodiment a set of node hierarchies includes a main node hierarchy and one or more sub-hierarchies. A rule may specify that adding a node property to a node in the main node hierarchy triggers adding the node property to the same node in each sub-hierarchy. Another rule may specify that adding a node property to a node in a sub-hierarchy does not trigger adding the node property to the same node in the main node hierarchy or in any other sub-hierarchies.

Based on determining that the modification to the first hierarchy of nodes does trigger a modification to another hierarchy of nodes, the system performs the modification to the first hierarchy of nodes (Operation 210) and identifies, based on the set of rules, the second modification to be performed to the second hierarchy of nodes (Operation 214).

According to one or more embodiments, prior to performing the first modification to the first hierarchy of nodes, the system may inform a user or entity initiating the instruction to modify the first hierarchy of nodes that the requested modification would trigger modifications in one or more additional node hierarchies. The notification may include identifying information of the affected node hierarchies and the types of modifications that would be triggered. The notification may provide a user or entity initiating the instruction to confirm, modify, or cancel the instruction to modify the first hierarchy of nodes.

Applying one or more rules in the set of rules, the system performs the second modification to the second hierarchy of nodes based on the first modification to the first hierarchy of nodes (Operation 214). For example, the system may apply a rule to add a same node to a second hierarchy of nodes that was added to a first hierarchy of nodes. The system may add the node to a different location within the second hierarchy of nodes, such as connecting to a different parent node. The system may add a node to one node hierarchy based on a node being removed from another node hierarchy. Conversely, the system may remove a node from a second node hierarchy based on the same node, or a different node, being added to a first node hierarchy. According to another example, the system may modify the same node in one or more node hierarchies based on modifying the node in a first node hierarchy. Alternatively, or in addition, the system may modify different nodes in one or more second node hierarchies based on modifying a particular node in a first node hierarchy.

4. Machine Learning Model Training

Figure 3:
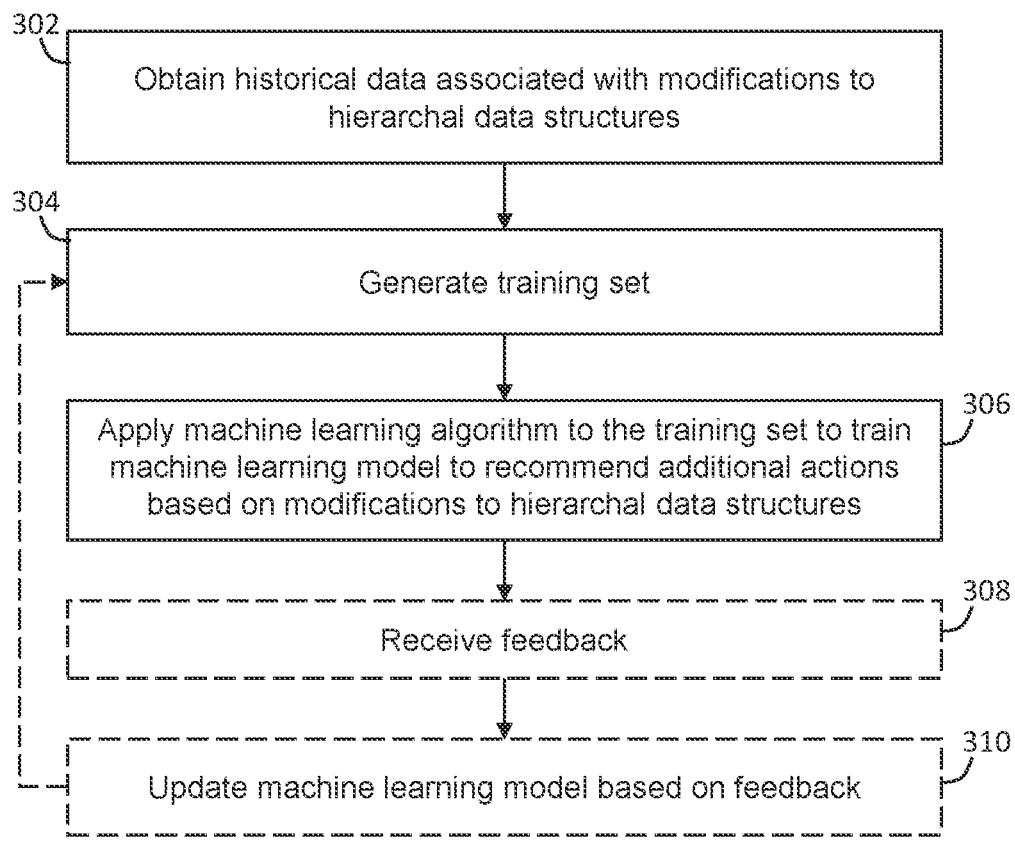
FIG. 3 illustrates an example set of operations for rule-based modifications to hierarchal data structures in accordance with one or more additional embodiments.

FIG. 3 illustrates an example set of operations for training a machine learning model to generate a recommendation for modifying a hierarchal data structure based on a modification to the same, or a different, hierarchal data structure, in accordance with one or more embodiments. A system obtains historical data associated with modifications to hierarchal data structures (Operation 302). For example, the system may obtain log information specifying hierarchal data structures, modifications to the hierarchal data structures, temporal data, such as timestamp data, regarding when the modifications were made to the hierarchal data structures, user information of users making changes to hierarchal data structures, and permissions data specifying which users are authorized to modify particular hierarchal data structures.

The historical modification information includes node properties of nodes in a node hierarchy that are modified. For example, if a modification includes moving a first node within a node hierarchy to be a child node of a second node, the system stores the historical information including the node properties of the original parent node, of the first node, and of the second node.

Once the various data (or subsets thereof) are identified in Operation 302, the system generates a set of training data (operation 304). Training data may include sets of modifications to data hierarchies. For example, one set of training data may include any modifications to a particular node in a set of different hierarchal data structures within a defined period of time. In addition, or in the alternative, a set of training data may include any modifications to any nodes in any hierarchal data structures within a specified period of time from a modification to a particular node in a particular hierarchal data structure. In addition, or in the alternative, a set of training data may include any modifications to parent/child relationships of nodes in any hierarchal data structures within a specified period of time from a modification to a parent/child relationship of a particular node in a particular hierarchal data structure.

The system applies a machine learning algorithm to the training data set (Operation 306). The machine learning algorithm analyzes the training data set to identify data and patterns that indicate relationships between particular modifications to hierarchal data structures. The machine learning model generates one or more recommendations for modifying, or refraining from modifying, one or more additional hierarchal data structures based on a modification to a particular hierarchal data structure. Types of machine learning models include, but are not limited to, linear regression, logistic regression, linear discriminant analysis, classification and regression trees, naïve Bayes, k-nearest neighbors, learning vector quantization, support vector machine, bagging, and random forest, boosting, backpropagation, and/or clustering.

In examples of supervising machine learning algorithms, the system may obtain feedback on the whether a particular recommended modification should be kept or discarded (Operation 308). The feedback may affirm that a particular proposed modification to a hierarchal data structure should be recommended based on a detected modification to another hierarchal data structure. In other examples, the feedback may indicate that a particular proposed modification to a hierarchal data structure should not be recommended based on a detected modification to another hierarchal data structure. Based on the feedback, the machine learning training set may be updated, thereby improving its analytical accuracy (Operation 310). Once updated, the system may further train the machine learning model by optionally applying the model to additional training data sets.

While an example is provided above for training a machine learning model to recommend additional modifications to hierarchal data structures, one or more embodiments include training a machine learning model to generate rules for modifying hierarchal data structures. Based on the example above, a machine learning model is applied to data representing a detected modification to a hierarchal data structure. The machine learning model generates a recommendation for modifying one or more additional hierarchal data structures. Alternatively, a system may automatically modify one or more additional hierarchal data structures, without intervening user input, based on the output generated by the machine learning model. In an alternative embodiment in which the system trains a machine learning model to generate a set of rules for modifying hierarchal data structures, the system may apply the set of rules to a detected modification to a hierarchal data structure to identify one or more additional modifications to one or more additional hierarchal data structures. In other words, once the machine learning model generates the set of rules, the system may refrain from applying the machine learning model to subsequent modifications to hierarchal data structures. Instead, the system analyzes or traverses the set of rules to identify whether the detected modification to a hierarchal data structure triggers one or more additional modifications.

According to one or more embodiments, the system may recognize that when a modification is detected in a hierarchal data structure within a designated group, it will be more likely that the modification will trigger one or more additional modifications of additional node hierarchies within the group. The system trains a machine learning model to generate rules or recommendations for when modification of one node hierarchy triggers modification of one or more additional node hierarchies. In one embodiment, the system applies the trained machine learning model to a test set of historical modifications to generate a test set of rules. The system provides the test set of rules to a user to obtain feedback. The system updates the machine learning model based on the feedback.

According to one or more embodiments, the system may apply the machine learning model to a set of historical modification information to generate a set of rules. When a user performs a modification to one node hierarchy, the system analyzes the set of rules to determine whether the modification to the one node hierarchy triggers modifications to one or more additional node hierarchies. The system generates a recommendation, based on the rule including the trigger, to modify the one or more additional node hierarchies. If the user accepts the recommendation, the system performs the modifications to the one or more additional node hierarchies. If the user rejects or modifies the recommendation, the system may retrain the machine learning model based on the user feedback.

Figure 4:
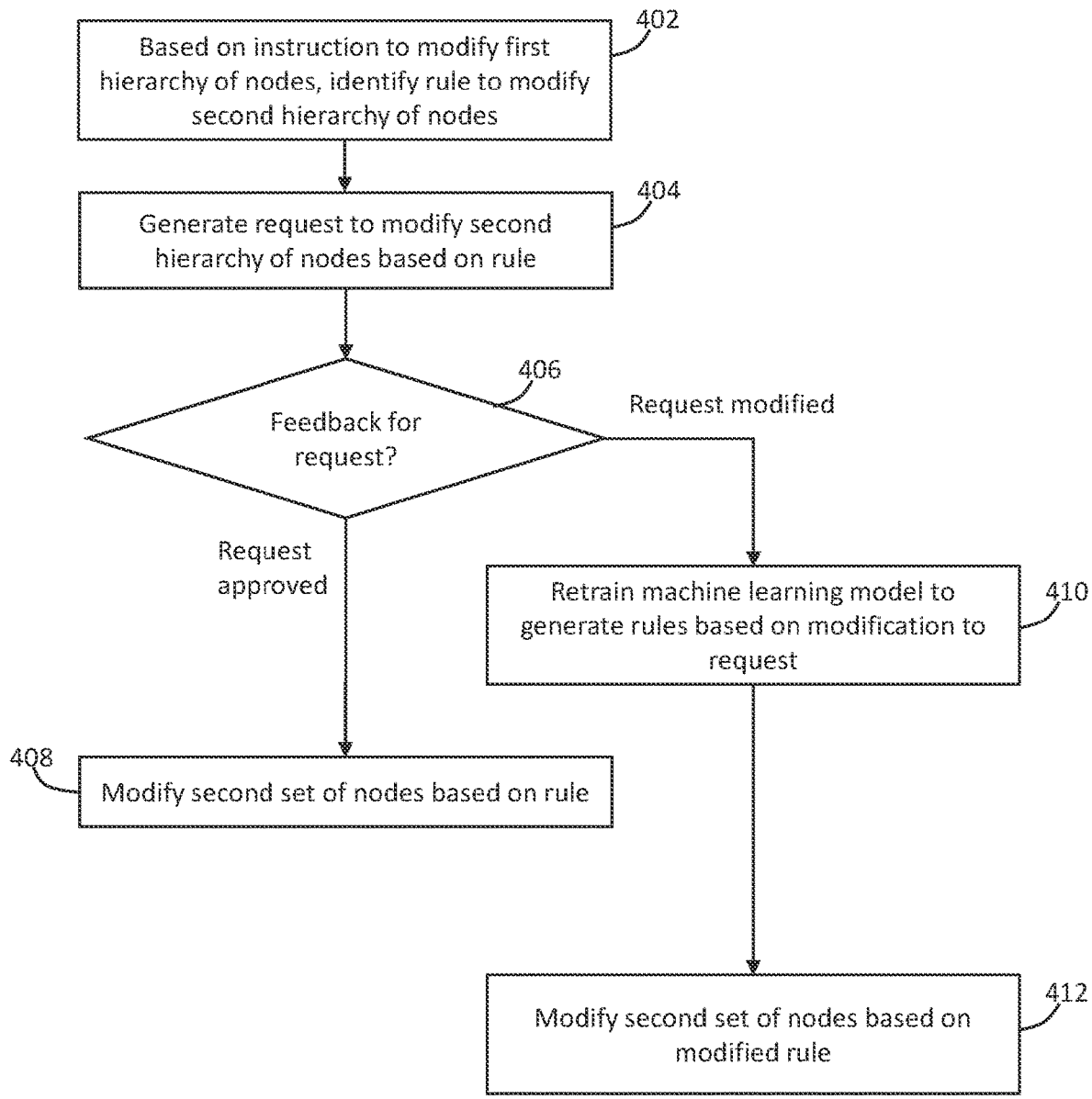
FIG. 4 illustrates an example set of operations for training a machine learning model to generate recommendations for modifying hierarchal data structures, according to one or more embodiments.

5. Feedback-Based Modification of Machine Learning Model for Generating Rules for Modifying Hierarchal Data Structures FIG. 4 illustrates an example set of operations for modifying a machine learning model for generating rules to modify hierarchal data structures in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

A system identifies one or more rules to modify a second hierarchy of nodes based on receiving an instruction to modify a first hierarchy of nodes (Operation 402). As discussed above, in connection with FIG. 2, a system may receive an instruction to modify a first node. The system analyzes a set of rules based on the instruction to modify the first hierarchy of nodes. Based on analyzing the set of rules, the system identifies the rules associated with the first modification that would trigger modifications to one or more additional hierarchies of nodes.

The system generates a request to modify the second hierarchy of nodes according to one or more rules associated with the modification to the first hierarchy of nodes (Operation 404). In one or more embodiments, the system modifies positions of nodes and node properties by: (a) receiving requests to modify a node hierarchy, and (b) receiving an approval of the request. For example, a system administrator or a user having appropriate authorization may approve requests to modify node hierarchies. In one or more embodiments, authorization of requests to modify node hierarchies is provided by a human. In addition, or in the alternative, approval of a request may be automatically generated after a predetermined period of time. The request to modify the first hierarchy of nodes may include information about the type of modification to the first hierarchy of nodes and information about modifications to any additional hierarchies of nodes triggered by the modification to the first hierarchy of nodes.

The system determines whether feedback is received in response to the request (Operation 406). For example, the system may determine whether the request to modify the second hierarchy of nodes is approved. Alternatively, the system may determine that the request has been denied or modified.

If the system determines the request is approved, system modifies second hierarchy of nodes (Operation 408). The system applies the identified rule to modify node properties or other characteristics of the second hierarchy of nodes, as indicated by the rule.

If the system determines that the request has been modified or denied, the system retrains a machine learning model that generates the rules (Operation 410). For example, the machine learning model may generate the initial rule to modify the second hierarchy of nodes based on historical information associated with modifying node hierarchies. Based on determining that the modification of the second hierarchy of nodes has been denied, the system may generate an alternative rule associated with the instruction to modify the first hierarchy of nodes. For example, the alternative rule may indicate a different node in a second hierarchy of nodes to be modified. Alternatively, the alternative rule may indicate that no second hierarchy of nodes should be modified based on the first modification to the first hierarchy of nodes.

Similarly, if the system determines that a user has modified the request to modify the second hierarchy of nodes, the system retrains the machine learning model based on the modified request. For example, the system may initially recommend modifying a first node in a second hierarchy of nodes based on a modification of a second node in a first hierarchy of nodes. If the system detects a user has cancelled the recommended modification of the first node, and instead instructed the system to modify third node in the second hierarchy of nodes, the system applies data associated with the cancelled recommendation and the user instructions to perform an alternative modification to a hierarchy of nodes to a machine learning model training engine to retrain the machine learning model accordingly. For example, the system identifies the node properties of the second node and the third node and re-trains the machine learning model based on input data recommending modification of the third node based on modification of the second node.

The system modifies the second hierarchy of nodes based on the modified request (Operation 412). For example, if a user changes a node modification request to include altering a node property value of an alternative node, the system alters the node property value of the alternative node instead of the node initially indicated in a rule generated by the machine learning model.

6. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 5A:
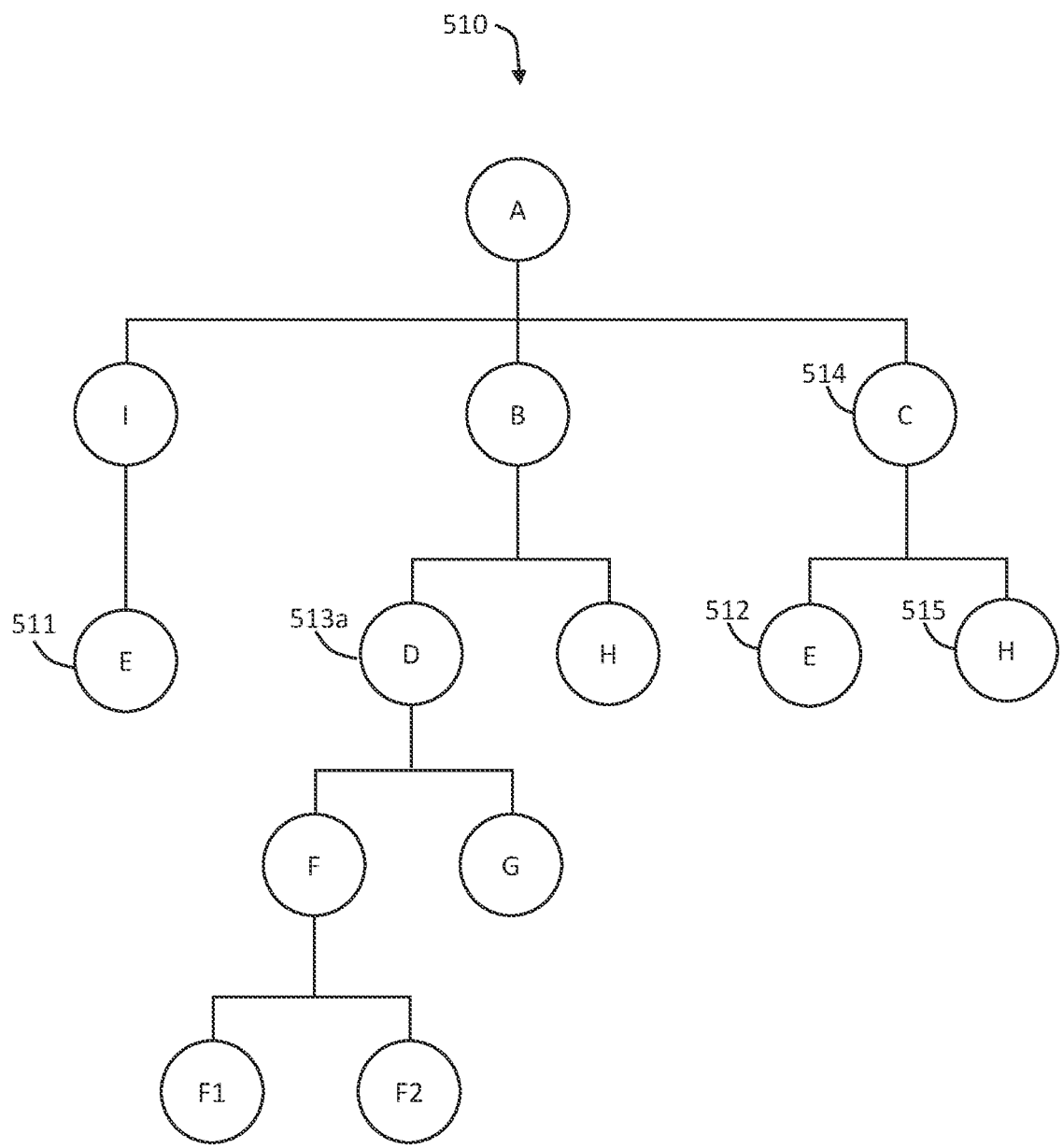
FIGS. 5A-5D illustrate an example embodiment of modifying a hierarchal data structure based on a modification to another hierarchal data structure.
Figure 5B:
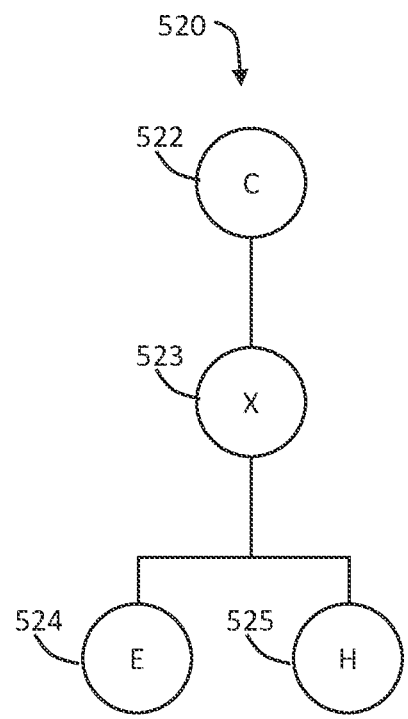

FIG. 5A illustrates a first hierarchal data structure 510. FIG. 5B illustrates a second hierarchal data structure 520. The first and second hierarchal data structures 510 and 520 are maintained by a same hierarchal data interface platform. The first and second hierarchal data structures 510 and 520 represent data from a same stored data set, such as a same database or set of tables and data objects. For example, the first hierarchal data structure 510 may represent a set of nodes displayed as user interface elements on a graphical user interface (GUI) associated with a first user having a first set of permissions. The second hierarchal data structure 510 may represent another set of nodes displayed as user interface elements on the GUI associated with a second user having a second set of permissions.

The first hierarchal data structure 510 includes nodes A, B, C, D, E, F, G, H, I, F1, and F2. The second hierarchal data structure 520 includes nodes C, X, E, and H. In the second hierarchal data structure 520, the node X 523 is a child node of node C 522 and a parent node of nodes E 524 and H 525. In contrast, in the first hierarchal data structure 510 nodes E 512 and H 515 are child nodes of node C 514.

According to an example embodiment, node A is a node type "department," with a node name "sales" and a set of node properties associated with a sales department of an organization. Nodes I, B, and C are node types "team." Node I is associated with a node name "Team 3." Node B is associated with a node name "Team 1." Node C is associated with a node name "Team 2." Each node includes a set of node properties associated with its particular team. Nodes E, D, and H are nodes of a type "Product." Node D has a node name: "Sales_Plus." Node E has a node name: "Cloud_Plus." Node H has a node name: "Inventory_Plus." Nodes F and G are of a node type: "Client." Node F has a node name: "ABC Co." Node G has a node name: "XYZ Co." Nodes F1 and F2 are of a node type: "Location" Node F1 has a node name "East Region." Node F2 has a node name "West Region."

Figure 5C:
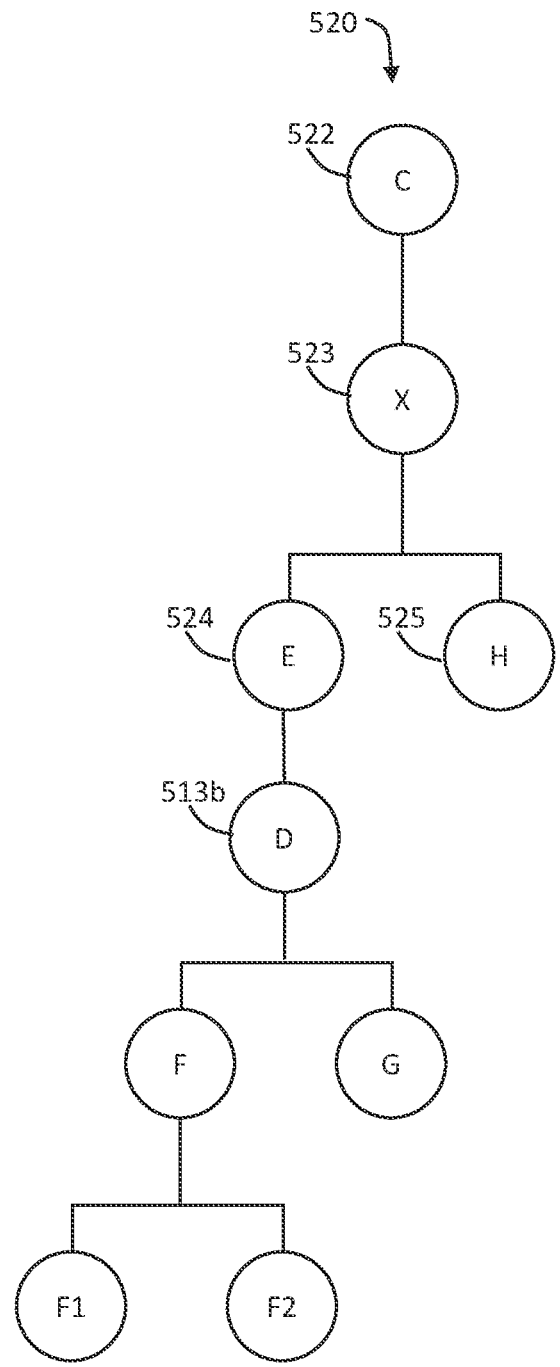

Referring to FIG. 5C, the system may detect a modification, or a proposed modification, that positions node D 513b beneath node E in the second hierarchal data structure 520. For example, a user may select a node icon associated with node D 513a from a representation of the first hierarchal data structure 510 in a GUI and drag the icon to a representation of the second hierarchal data structure 520 in the GUI. Based on detecting the modification to the second hierarchal data structure 520, the system applies data associated with the modification of the second hierarchal data structure 520 to a set of rules to determine whether to perform one or more additional modifications, such as modifying the first hierarchal data structure 510 based on the modification to the second hierarchal data structure 520.

For example, the system may detect the presence of nodes in one or more hierarchal data structures that are the same as one or more nodes selected to be modified in the hierarchal data structure 520. In the example illustrated in FIGS. 5A-5C, the system may identify the modification of node E 524 in the second hierarchal data structure 520 and the presence of node E 512 and node E 511 in the hierarchal data structure 510. The system applies data associated with the proposed modification to a set of rules to determine whether to modify one or both of nodes 511 and 512, or any other nodes, in the first hierarchal data structure 510.

The system may identify a rule that generates a notification requiring user confirmation when a modification is detected to a hierarchal data structure that would also modify another hierarchal data structure. According to one example, the system may identify a rule that specifies a change in a parent/child relationship of a node in the hierarchal data structure 520 triggers, without intervening user input, a same change in the hierarchal data structure 510 if the node or nodes being added or modified in the second hierarchal data structure 520 are the same as a set of nodes in the first hierarchal data structure 510. For example, the nodes D, F, G, F1, and F2 selected to add to the second hierarchal data structure 520 have the same hierarchal relationships as the nodes D, F, G, F1, and F2 in the first hierarchal data structure 510. According to another example, the system may identify a rule specifying that node D 513*b* should be positioned as a child node of node X 523 instead of node C 522.

Figure 5D:
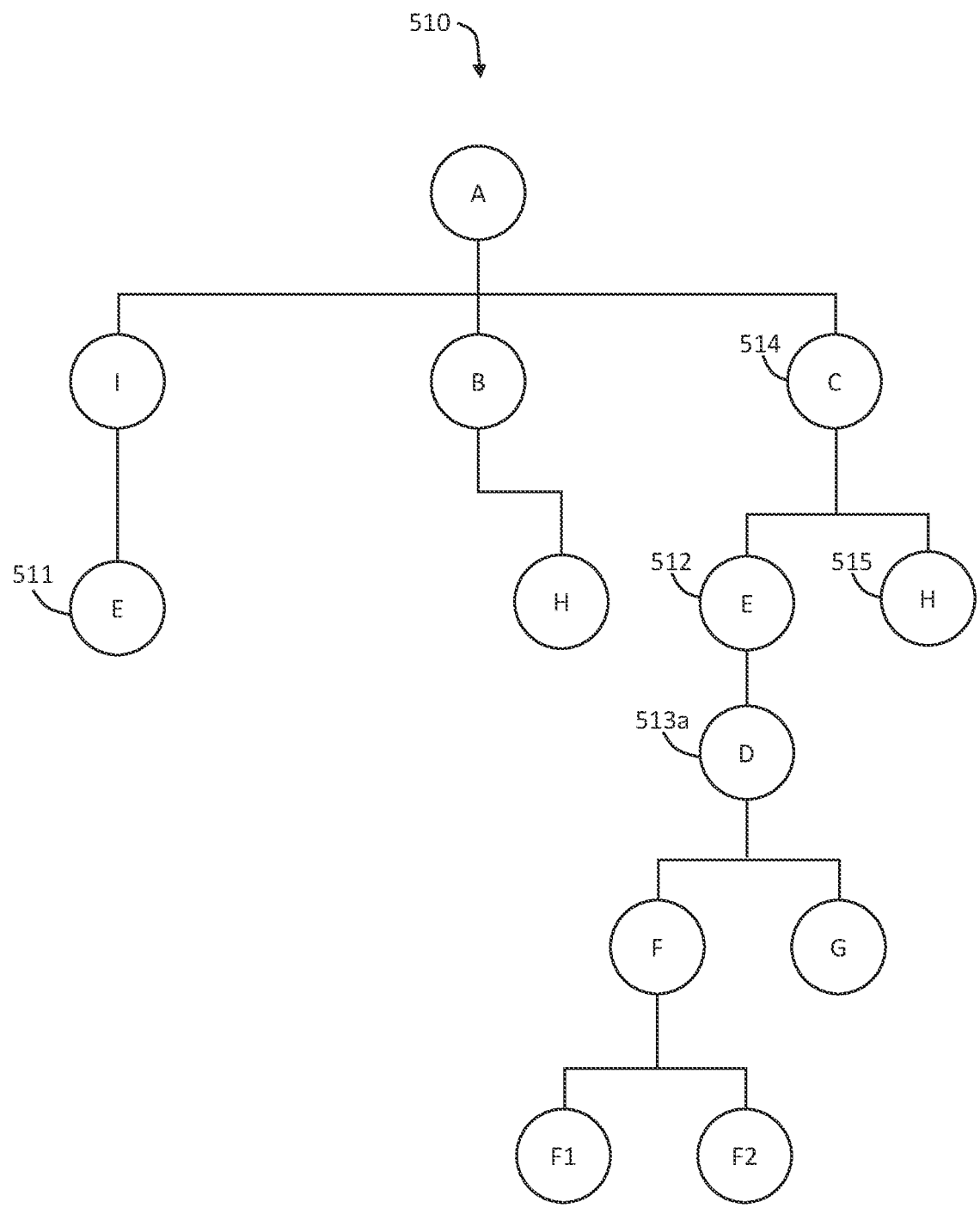

Based on applying a set of pre-defined rules, the system may modify the first hierarchal data structure as shown in FIG. 5D to move the node D 513*a* and child nodes F, G, F1, and F2 to depend from node E 512. Based on applying the set of pre-defined rules, the system may refrain from moving a copy of node D 513*a* or the child nodes F, G, F1, and F2 to depend from node E 511.

According to another example, the set of rules may specify that, based on the modification to the second hierarchal data structure 520, node E 511 should be deleted.

According to another example, the system detects an instruction to delete node E 511 in the first hierarchal data structure 510. The system determines whether the modification should result in a corresponding deletion to node E 524 in the second hierarchal data structure 520. The system may identify a rule—user-generated or machine-learning generated based on historical modification information—indicating that if any node E exists in the first hierarchal data structure 510, a corresponding node E should exist in the second hierarchal data structure 520. Based on the existence of node E 512 in the first hierarchal data structure 510, the system would not delete node E 524 of the second hierarchal data structure 520.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
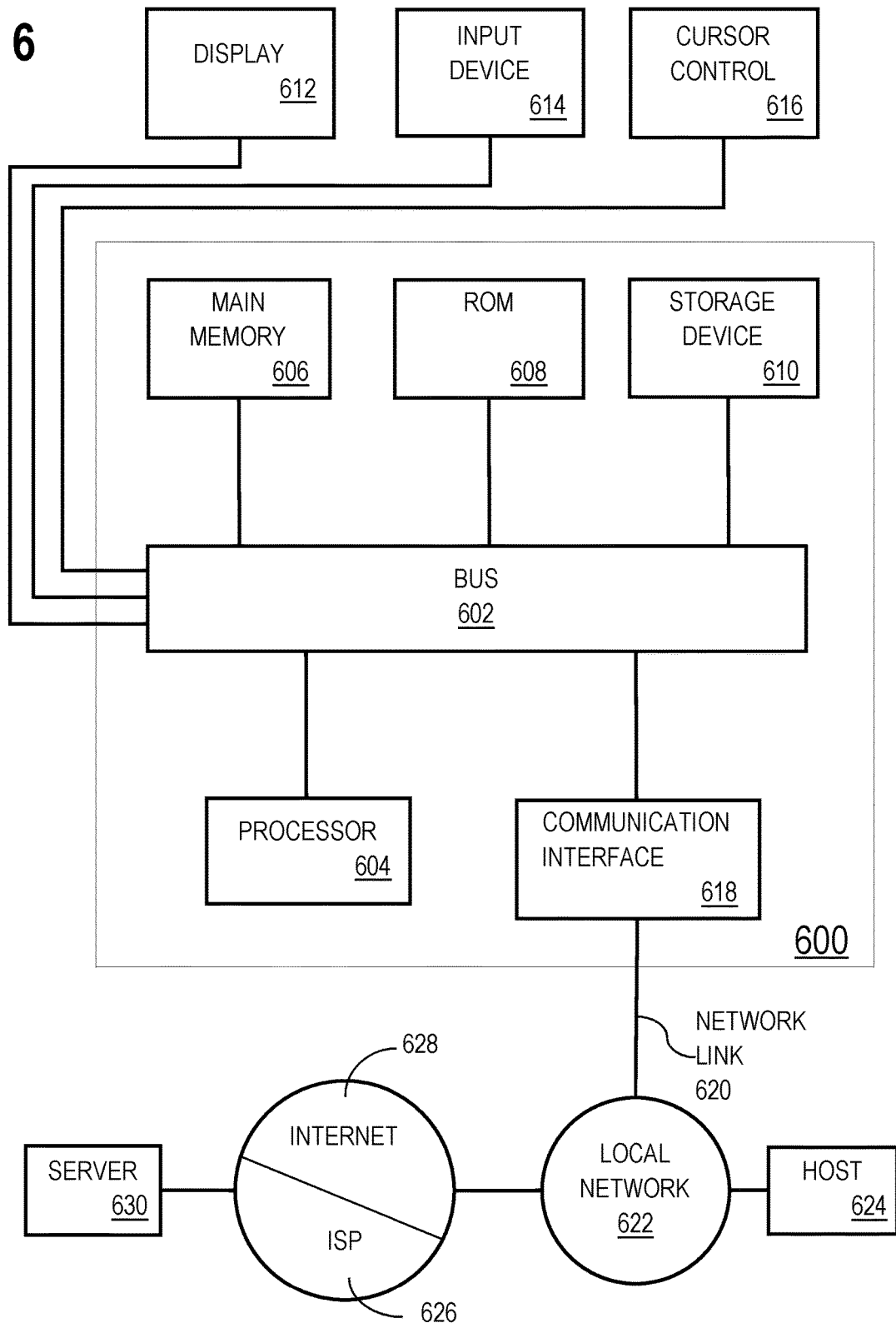
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    storing a plurality of hierarchies of nodes in a data repository, wherein the nodes represent entities, and wherein a position of a first particular node in a particular hierarchy relative to a second particular node in the particular hierarchy represents a relationship of the first particular node relative to the second particular node;
    monitoring, by a hierarchal data interface engine in communication with at least one client device and the data repository, instructions corresponding to a first hierarchy of nodes of the plurality of hierarchies of nodes to detect instructions for modifying the first hierarchy of nodes;
    detecting, by the hierarchal data interface engine, a first instruction to perform a first modification to the first hierarchy of nodes corresponding to a respective first plurality of entities, each node among the first hierarchy of nodes including a set of node properties associated with a respective entity among the plurality of entities; and
    responsive to receiving the first instruction:
        (a) identifying, by a data set modification engine, a first rule to perform, based on the first modification to the first hierarchy of nodes, a second modification to a second hierarchy of nodes corresponding to a respective second plurality of entities, the second hierarchy of nodes being different than the first hierarchy of nodes, and the second modification being different than the first modification;
        (b) performing, by the data set modification engine, the first modification to the first hierarchy of nodes; and
        (c) applying, by the data set modification engine, the first rule to perform the second modification to the second hierarchy of nodes.

2. The non-transitory computer readable medium of claim 1, wherein the first hierarchy of nodes and the second hierarchy of nodes represent different subsets of a same data set.

3. The non-transitory computer readable medium of claim 1, wherein the operations further comprise:
    receiving a second instruction to perform a third modification to the first hierarchy of nodes; and
    responsive to receiving the second instruction:
        (a) determining, by the data set modification engine, based on a set of rules including the first rule, that no modification is required for the second hierarchy of nodes based on the third modification to the first hierarchy of nodes; and
        (b) performing the third modification to the first hierarchy of nodes without performing any modification to the second hierarchy of nodes.

4. The non-transitory computer readable medium of claim 1, wherein the operations further comprise:
    detecting, by the hierarchal data interface engine, a second instruction to perform a third modification to the second hierarchy of nodes; and
    responsive to detecting the second instruction:
        (a) identifying a second rule to perform, based on the third modification to the second hierarchy of nodes, a fourth modification to the first hierarchy of nodes;
        (b) performing the third modification to the second hierarchy of nodes; and
        (c) applying the second rule to perform the fourth modification to the first hierarchy of nodes.

5. The non-transitory computer readable medium of claim 1, wherein the first modification to the first hierarchy of nodes comprises modifying a single node in the first hierarchy of nodes, and
    wherein the second modification to the second hierarchy of nodes comprises modifying a plurality of nodes in the second hierarchy of nodes based on modifying the single node in the first hierarchy of nodes.

6. The non-transitory computer readable medium of claim 1, wherein the first modification to the first hierarchy of nodes comprises adding a single node to the first hierarchy of nodes, and
    wherein the second modification to the second hierarchy of nodes comprises adding a plurality of nodes to the second hierarchy of nodes.

7. The non-transitory computer readable medium of claim 1, wherein the first modification to the first hierarchy of nodes includes modifying a first node property value of a first node in the first hierarchy of nodes, and
    wherein the second modification to the second hierarchy of nodes includes modifying a second node property value of a second node in the second hierarchy of nodes, the second node property value being different from the first node property value.

8. The non-transitory computer readable medium of claim 7, wherein the first rule includes a formula for generating a second node property value based on the first node property value.

9. The non-transitory computer readable medium of claim 1, wherein the first plurality of entities associated with the first hierarchy of nodes is different than the second plurality of entities associated with the second hierarchy of nodes.

10. The non-transitory computer readable medium of claim 1, wherein the first hierarchy of nodes has a different hierarchal structure than the second hierarchy of nodes.

11. The non-transitory computer readable medium of claim 1, wherein the first hierarchy of nodes includes a first instance of a first node including a first set of node properties,
wherein the second hierarchy of nodes includes a second instance of the first node including a second set of node properties, the second set of node properties being the same as the first set of node properties,
wherein the first modification to the first hierarchy of nodes includes positioning the first instance of the first node as a child node of a second node including a third set of node properties, and
wherein the second modification to the second hierarchy of nodes includes positioning the second instance of the first node as a child node of a third node in the second hierarchy of nodes, the third node including a fourth set of node properties, the fourth set of node properties being different from the third set of node properties.

12. The non-transitory computer readable medium of claim 1, wherein the first modification to the first hierarchy of nodes includes adding a first node to the first hierarchy of nodes as a child node of a second node of the first hierarchy of nodes,
wherein the second hierarchy of nodes does not include any instance of the second node,
wherein the first rule specifies a third node of the second hierarchy of nodes, and
wherein modifying the second hierarchy of nodes includes adding an instance of the first node as a child node of the third node in the second hierarchy of nodes.

13. The non-transitory computer readable medium of claim 1, wherein the operations further comprise:
applying a set of node properties associated with the first modification to a machine learning model to generate the first rule.

14. The non-transitory computer readable medium of claim 13, wherein the operations further comprise:
obtaining a historical data set comprising (a) historical modifications to the first hierarchy of nodes, and (b) historical modifications to the second hierarchy of nodes based on the historical modifications to the first hierarchy of nodes; and
training the machine learning model based on (a) and (b) to generate rules for modifying the second hierarchy of nodes based on modifications to the first hierarchy of nodes.

15. A method comprising:
storing a plurality of hierarchies of nodes in a data repository, wherein the nodes represent entities, and wherein a position of a first particular node in a particular hierarchy relative to a second particular node in the particular hierarchy represents a relationship of the first particular node relative to the second particular node;
monitoring, by a hierarchal data interface engine in communication with at least one client device and the data repository, instructions corresponding to a first hierarchy of nodes of the plurality of hierarchies of nodes to detect instructions for modifying the first hierarchy of nodes;
detecting, by the hierarchal data interface engine, a first instruction to perform a first modification to the first hierarchy of nodes corresponding to a respective first plurality of entities, each node among the first hierarchy of nodes including a set of node properties associated with a respective entity among the plurality of entities; and
responsive to receiving the first instruction:
(a) identifying, by a data set modification engine, a first rule to perform, based on the first modification to the first hierarchy of nodes, a second modification to a second hierarchy of nodes corresponding to a respective second plurality of entities, the second hierarchy of nodes being different than the first hierarchy of nodes, and the second modification being different than the first modification;
(b) performing, by the data set modification engine, the first modification to the first hierarchy of nodes; and
(c) applying, by the data set modification engine, the first rule to perform the second modification to the second hierarchy of nodes.

16. The method of claim 15, wherein the first hierarchy of nodes and the second hierarchy of nodes represent different subsets of a same data set.

17. The method of claim 15, further comprising:
receiving a second instruction to perform a third modification to the first hierarchy of nodes; and
responsive to receiving the second instruction:
(a) determining, by the data set modification engine, based on a set of rules including the first rule, that no modification is required for the second hierarchy of nodes based on the third modification to the first hierarchy of nodes; and
(b) performing the third modification to the first hierarchy of nodes without performing any modification to the second hierarchy of nodes.

18. The method of claim 15, further comprising:
detecting, by the hierarchal data interface engine, a second instruction to perform a third modification to the second hierarchy of nodes; and
responsive to receiving the second instruction:
(a) identifying, by the data set modification engine, a second rule to perform, based on the third modification to the second hierarchy of nodes, a fourth modification to the first hierarchy of nodes;
(b) performing the third modification to the second hierarchy of nodes; and
(c) applying the second rule to perform the fourth modification to the first hierarchy of nodes.

19. The method of claim 15, wherein the first modification to the first hierarchy of nodes comprises modifying a single node in the first hierarchy of nodes, and
wherein the second modification to the second hierarchy of nodes comprises modifying a plurality of nodes in the second hierarchy of nodes based on modifying the single node in the first hierarchy of nodes.

20. A system comprising:
one or more processors; and
memory storing instructions that, when executed by the one or more processors, cause the system to perform:
storing a plurality of hierarchies of nodes in a data repository, wherein the nodes represent entities, and wherein a position of a first particular node in a particular hierarchy relative to a second particular node in the particular hierarchy represents a relationship of the first particular node relative to the second particular node;
monitoring, by a hierarchal data interface engine in communication with at least one client device and the data repository, instructions corresponding to a first hierarchy of nodes of the plurality of hierarchies of nodes to detect instructions for modifying the first hierarchy of nodes;

detecting, by the hierarchal data interface engine, a first instruction to perform a first modification to the first hierarchy of nodes corresponding to a respective first plurality of entities, each node among the first hierarchy of nodes including a set of node properties associated with a respective entity among the plurality of entities; and responsive to receiving the first instruction:
  (a) identifying, by a data set modification engine, a first rule to perform, based on the first modification to the first hierarchy of nodes, a second modification to a second hierarchy of nodes corresponding to a respective second plurality of entities, the second hierarchy of nodes being different than the first hierarchy of nodes, and the second modification being different than the first modification;
  (b) performing, by the data set modification engine, the first modification to the first hierarchy of nodes; and
  (c) applying, by the data set modification engine, the first rule to perform the second modification to the second hierarchy of nodes.

* * * * *